United States Patent
Hart et al.

(10) Patent No.: US 11,720,067 B2
(45) Date of Patent: Aug. 8, 2023

(54) METHOD FOR HANDLING A SIMULTANEOUS FAILURE OF ALL CHANNELS OF A MULTI-CHANNEL ENGINE CONTROLLER FOR A GAS TURBINE ENGINE

(71) Applicant: General Electric Company, Schenectady, NY (US)

(72) Inventors: David Leo Hart, Loveland, OH (US); Adam Joseph Reese, Cincinnati, OH (US); Jeffrey Scott Gilton, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 366 days.

(21) Appl. No.: 16/833,870

(22) Filed: Mar. 30, 2020

(65) Prior Publication Data
US 2021/0301734 A1 Sep. 30, 2021

(51) Int. Cl.
G05B 9/03 (2006.01)
G06F 11/07 (2006.01)

(52) U.S. Cl.
CPC ............ *G05B 9/03* (2013.01); *G06F 11/0793* (2013.01)

(58) Field of Classification Search
None
See application file for complete search history.

(56) References Cited

U.S. PATENT DOCUMENTS

| | | | |
|---|---|---|---|
| 6,480,780 B1 | 11/2002 | Schwamm | |
| 6,813,527 B2 | 11/2004 | Hess | |
| 8,051,031 B2 | 11/2011 | Sims, III et al. | |
| 8,055,393 B2 | 11/2011 | Sims, III et al. | |
| 8,762,785 B2 | 6/2014 | Wang et al. | |
| 8,806,579 B1 | 8/2014 | Angus et al. | |
| 9,217,376 B2 | 12/2015 | Sweet et al. | |
| 9,298,447 B2 | 3/2016 | Frayssignes | |
| 9,382,011 B2* | 7/2016 | Darby | H04L 12/40189 |
| 9,483,032 B2* | 11/2016 | Kamenetz | F02C 9/46 |
| 9,619,252 B2 | 4/2017 | Lopez et al. | |
| 10,099,796 B2* | 10/2018 | Spack | F01D 21/003 |
| 10,234,917 B2 | 3/2019 | Cartes et al. | |

(Continued)

OTHER PUBLICATIONS

Brotherton, Tom, et al. "Prognosis of faults in gas turbine engines." 2000 IEEE Aerospace Conference. Proceedings (Cat. No. 00TH8484). vol. 6. IEEE, 2000. (Year: 2000).*

(Continued)

*Primary Examiner* — Carlos R Ortiz Rodriguez

(74) *Attorney, Agent, or Firm* — Dority & Manning, P.A.

(57) ABSTRACT

A method for handling a simultaneous failure of all channels of a multi-channel engine controller configured to control operation of a gas turbine engine is provided. The method includes obtaining, by a first processor associated with a first channel of the engine controller, data indicative of the simultaneous failure of all channels of the engine controller. The method further includes providing, by the first processor, one or more control signals associated with resetting at least a second processor associated with a second channel of the multi-channel engine controller based, at least in part, on the data. Furthermore, the method includes controlling, by the first processor, operation of the gas turbine engine while at least the second processor is resetting.

18 Claims, 6 Drawing Sheets

(56) References Cited

U.S. PATENT DOCUMENTS

| | | |
|---|---|---|
| 2006/0200278 A1 | 9/2006 | Feintuch |
| 2007/0260799 A1 | 11/2007 | Machida |
| 2017/0102968 A1 | 4/2017 | Pont |
| 2017/0351233 A1* | 12/2017 | Kamenetz .............. G05B 15/02 |
| 2018/0212858 A1 | 7/2018 | Yang |
| 2018/0349235 A1 | 12/2018 | Freydel et al. |

OTHER PUBLICATIONS

Yao-ming, Zhou, et al. "Dual-redundancy smart rotating speed sensor design for unmanned helicopter." 2011 6th IEEE Conference on Industrial Electronics and Applications. IEEE, 2011. (Year: 2011).*

* cited by examiner

METHOD FOR HANDLING A SIMULTANEOUS FAILURE OF ALL CHANNELS OF A MULTI-CHANNEL ENGINE CONTROLLER FOR A GAS TURBINE ENGINE

FEDERALLY SPONSORED RESEARCH

This invention was made with government support under contract N00019-04-C-0093 awarded by the US Naval Air Systems Command. The government may have certain rights in the invention.

FIELD OF THE INVENTION

The present subject matter relates generally to a method for handling a simultaneous failure of all channels of a multi-channel engine controller configured to control operation of a gas turbine engine. More specifically, the present subject matter is directed to a method for resetting each channel of the multi-channel engine controller without experiencing a lapse in control of the gas turbine engine.

BACKGROUND OF THE INVENTION

A gas turbine engine on an aircraft generally includes, in serial flow, a compressor section, a combustion section, a turbine section and an exhaust section. In operation, air enters an inlet of the compressor section where one or more compressors progressively compress the air until it reaches the combustion section. Fuel is mixed with the compressed air and burned within the combustion section to provide combustion gases. The combustion gases are then routed from the combustion section through a hot gas path defined within the turbine section and exhausted from the turbine section via the exhaust section.

Operation of the gas turbine engine may be controlled via an engine controller. Typical engine controllers can have dual channels to provide redundancy. For instance, typical engine controllers can include a first processor associated with a first channel of the engine controller and a second processor associated with a second channel of the engine controller. In some implementations, the two channels (e.g., first channel and second channel) may operate in an active/standby mode where one channel is active and in control while the other channel is in standby and ready to assume control if needed. In alternative implementations, the two channels may operate in an active/active mode where both channels are in control. Still further, in some implementations, the two channels may operate in a mixed mode where the engine controller implements an active/standby scheme and an active/active scheme.

In some instances, both the first channel and the second channel may each simultaneously experience one or more fault conditions (e.g., software exceptions). In such instances, both the first processor and the second processor may reset at the same time. This is undesirable, because resetting both the first processor and the second processor at the same time leaves no processor available to control operation of the gas turbine engine.

Accordingly, a method for handing a simultaneous failure of all channels of a multi-channel engine controller configured to control operation of a gas turbine engine would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for handling a simultaneous failure of all channels of a multi-channel engine controller configured to control operation of a gas turbine engine. The method includes obtaining, by a first processor associated with a first channel of the engine controller, data indicative of the simultaneous failure of all channels of the engine controller. The method further includes providing, by the first processor, one or more control signals associated with resetting at least a second processor associated with a second channel of the multi-channel engine controller based, at least in part, on the data. Furthermore, the method includes controlling, by the first processor, operation of the gas turbine engine while at least the second processor is resetting.

In another aspect, the present disclosure is directed to a multi-channel engine controller configured to control operation of a gas turbine engine. The multi-channel engine controller includes a plurality of processors. Each of the plurality of processors is associated with a corresponding channel of the multi-channel engine controller. A first processor associated with a first channel of the multi-channel engine controller is configured to obtain data indicative of a simultaneous failure of all channels of the multi-channel engine controller. The first processor is further configured to provide one or more control signals associated with resetting at least a second processor associated with a second channel of the multi-channel engine controller based, at least in part, on the data. The first processor is further configured to control operation of the gas turbine engine while at least the second processor is resetting.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures in which.

DETAILED DESCRIPTION OF THE INVENTION

Figure 1:
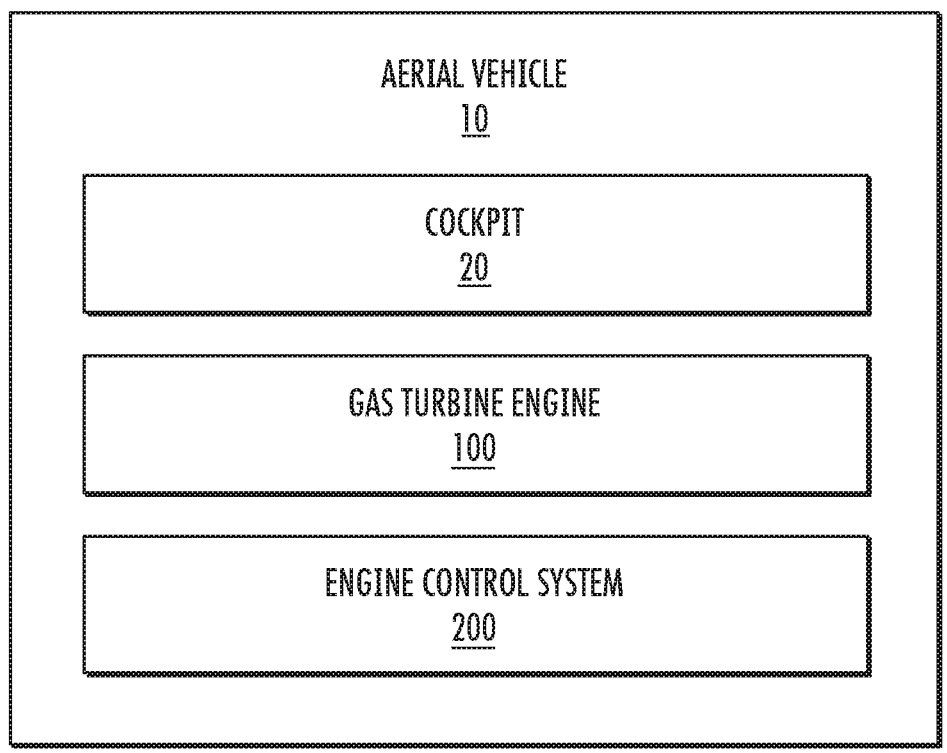
FIG. 1 depicts an aerial vehicle according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first" and "second" may be used interchangeably to distinguish one component from another and are not intended to signify location or importance of the individual components. Furthermore, the term "about" may refer to within 10% of a stated numerical value.

Example aspects of the present disclosure are directed to a multi-channel engine controller configured to control operation of a gas turbine engine. More specifically, the present disclosure is directed to methods for handling a simultaneous failure of all channels of the multi-channel engine controller. As will be discussed below in more detail, the multi-channel engine controller can be configured to recover from the simultaneous failure of all channels of the engine controller such that an amount of time during which the multi-channel engine controller is offline and unavailable to control operation of the gas turbine engine is reduced or eliminated.

In some implementations, a first processor associated with a first channel of the engine controller can be configured to obtain data indicative of the simultaneous failure of all channels of the multi-channel engine controller. For example, the first processor can simultaneously obtain data indicative of one or more fault conditions (e.g., software exceptions) associated with the first channel and one or more fault conditions associated with at least a second channel of the multi-channel engine controller. The first processor can be further configured to determine whether the first channel is healthier than every other channel (e.g., at least the second channel) of the multi-channel engine controller based, at least in part, on the data indicative of the one or more fault conditions associated with the first channel and the one or more fault conditions associated with every other channel (e.g., at least the second channel) of the multi-channel engine controller.

In some implementations, the first processor can compare one or more fault conditions associated with the first channel to one or more fault conditions associated with every other channel (e.g., at least the second channel) of the multi-channel engine controller. For instance, in some implementations, the first processor can be configured to determine the first channel is healthier than every other channel of the multi-channel engine controller when a total number of the fault conditions associated with the first channel is less than a total number of fault conditions associated with each of the remaining channels (e.g., at least the second channel) of the multi-channel engine controller. Conversely, the first processor can be configured to determine another channel (e.g., the second channel) is healthier than the first channel when the total number of the fault conditions associated with the first channel is greater than the total number of fault conditions associated with another channel (e.g., the second channel) of the multi-channel engine controller.

In some implementations, the first processor can be configured to provide one or more control signals to at least a second processor associated with the second channel of the engine controller in response to determining the first channel is healthier than every other channel of the multi-channel engine controller. More specifically, the one or more control signals can be associated with resetting the second processor. In this manner, the second processor can be configured to reset (e.g., reinitialize, reboot, etc.) itself in response to receiving the one or more control signals from the first processor.

The first processor can be further configured to configure itself in a safe mode in response to determining the first channel is healthier than every other channel of the multi-channel engine controller. When the first processor is configured in the safe mode, the first processor can be configured to perform only critical functions necessary to provide uniform control of the gas turbine engine while the multi-channel engine controller is recovering from the simultaneous failure of all channels of the multi-channel engine controller.

In some implementations, the first processor can be configured to control operation of one or more actuators (e.g., torque motor, fuel metering solenoid valve, etc.) of the gas turbine engine while the first processor is configured in the safe mode. It should be understood that the first processor executes a limited set of computer-implemented instructions when the first processor is configured in the safe mode.

As discussed above, the second processor can be configured to reset itself upon receiving the one or more control signals provided via the first processor. Furthermore, when the second processor resets itself, the second processor can be configured to determine whether the one or more fault conditions associated with the second channel still exist. When the second processor determines the one or more fault conditions associated with the second channel no longer exist, the second processor can provide data to the first processor to indicate the second channel has recovered from the one or more fault conditions associated with the second channel. For instance, in some implementations, the data can be one or more control signals associated with resetting the first processor. Upon receiving the one or more control signals from the second processor, the first processor can be configured to reset itself.

When the first processor is resetting itself, the second processor can be configured to control operation of the gas turbine engine. It should be appreciated that the second processor can be configured to operate in a normal operating mode (e.g., not the safe operating mode) since the second processor was previously reset to clear the one or more fault conditions associated with the second channel. In this manner, the gas turbine engine can operate normally (e.g., not in the safe mode) while the first processor is being reset to clear the one or more fault conditions associated with the first channel. As will be discussed below in more detail, in some instances an initial reset of the second processor may not result in the one or more fault conditions associated with the second channel being cleared.

When the second processor determines the one or more fault conditions associated with the second channel still exist after the initial reset, the second processor can be configured to reboot itself again and subsequently check to see if the one or more fault conditions associated with the second channel still exist. It should be appreciated that, in some implementations, the second processor can be configured to reset itself a predetermined number of times. If the one or more fault conditions associated with the second channel still exist after the second processor has reset itself the predetermined number of times, the one or more fault conditions associated with the second channel can be considered non-recoverable fault conditions. In this manner, the second channel cannot be brought back online.

In implementations in which resetting the second processor does not resolve (e.g. clear) the one or more fault conditions associated with the second channel, the first processor can be configured to reset itself while configured in the safe mode to clear the one or more fault conditions associated with the first channel. It should be appreciated that the first processor can be configured to reset itself within a predetermined amount of time to minimize an amount of time the first processor is offline and therefore unavailable to control operation of the gas turbine engine. For instance, in some implementations, the predetermined amount of time can range from about 2 milliseconds to about 5 milliseconds. In this manner, the engine controller can be configured to handle simultaneous failure of all channels of the engine controller occurring during critical portions of a flight, such as during vertical takeoff and landing.

Referring now to FIGS., FIG. 1 provides a perspective view of an exemplary aerial vehicle 10 in accordance with the present disclosure. The aerial vehicle 10 can include a cockpit 20. The cockpit 20 can include an instrument panel (not shown) having one or more input devices that can be used to control operation of the aerial vehicle 10. As shown, the aerial vehicle 10 can include a gas turbine engine 100. Although the aerial vehicle 10 is depicted as having only one gas turbine engine 100, it should be appreciated that, in some implementations, the aerial vehicle 10 can include multiple (e.g., two or more) gas turbine engine. Furthermore, the aerial vehicle 10 can include an engine control system 200 configured to control operation of the gas turbine engine 100.

It should be appreciated that the aerial vehicle 10 according to the present disclosure can include any suitable type of aerial vehicle 10. For instance, the aerial vehicle 10 can be a high speed compound rotary-wing aircraft with supplemental translational thrust systems, dual contra-rotating, coaxial rotor system aircraft, turboprops, tilt-rotors, tilt-wing aircraft, conventional take-off and landing aircraft and other turbine driven machines will also benefit from the present disclosure.

Figure 2:
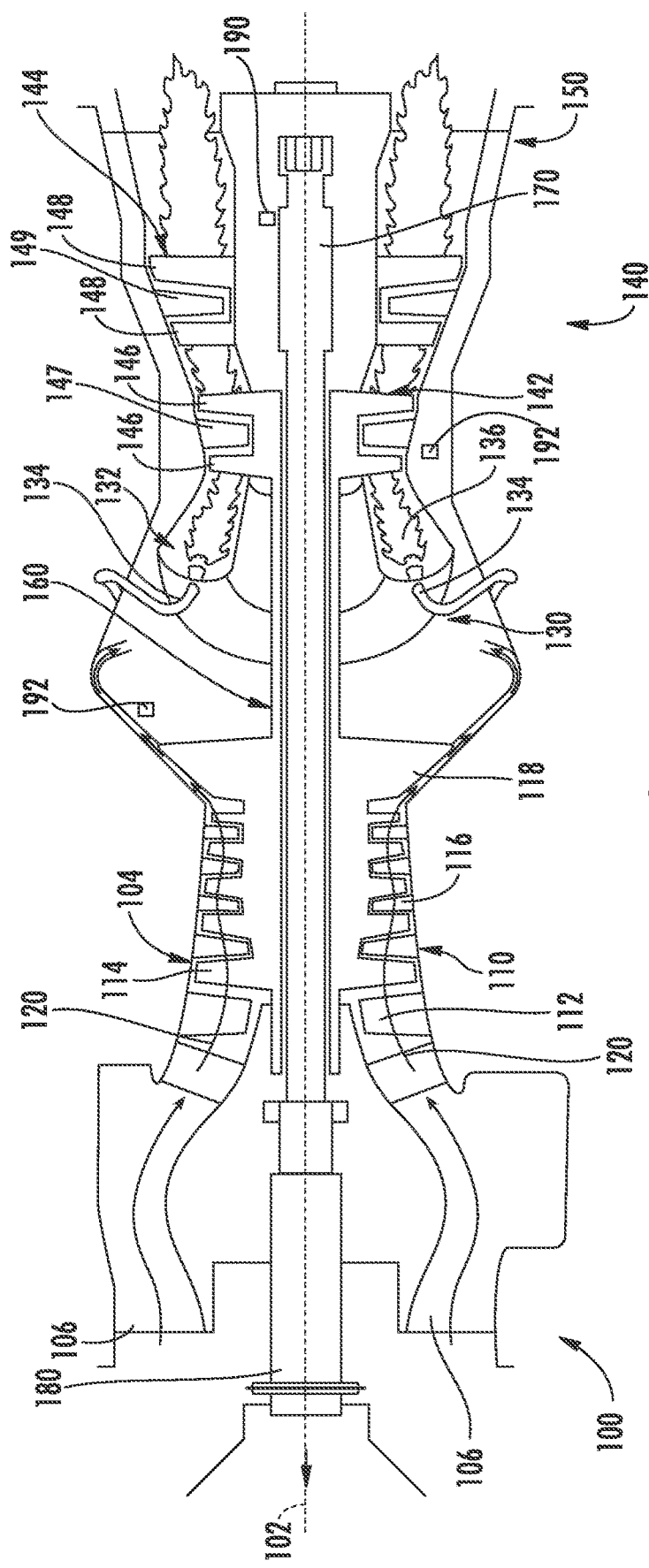
FIG. 2 depicts a cross-sectional view of a gas turbine engine according to example embodiments of the present disclosure.

FIG. 2 provides a schematic cross-sectional view of the gas turbine engine 100 in accordance with the present disclosure. As shown in FIG. 2, the gas turbine engine 100 defines a longitudinal or centerline axis 102 extending through for reference. The gas turbine engine 100 generally includes a substantially tubular outer casing 104 that defines an annular inlet 106. The outer casing 104 may be formed from a single casing or multiple casings. The outer casing 104 encloses, in serial flow relationship, a gas generator compressor 110, a combustion section 130, a turbine 140, and an exhaust section 150. The gas generator compressor 110 includes an annular array of inlet guide vanes 112, one or more sequential stages of compressor blades 114, one or more sequential stages of one or more stages of variable vanes 116, one or more sequential stages of one or more stationary compressor vanes 117, and a centrifugal compressor 118. Collectively, the compressor blades 114, variable vanes 116, stationary compressor vanes 117, and the centrifugal compressor 118 define a compressed air path 120.

The combustion section 130 includes a combustion chamber 132 and one or more fuel nozzles 134 extending into the combustion chamber 132. The fuel nozzles 134 supply fuel to mix with compressed air entering the combustion chamber 132. Further, the mixture of fuel and compressed air combust within the combustion chamber 132 to form combustion gases 136. As will be described below in more detail, the combustion gases 136 drive both the gas generator compressor 110 and the turbine 140.

The turbine 140 includes a gas generator turbine 142 and a power turbine 144. The gas generator turbine 142 includes one or more sequential stages of turbine rotor blades 146 and one or more sequential stages of stator vanes 147. Likewise, the power turbine 144 includes one or more sequential stages of turbine rotor blades 148 and one or more sequential stages of stator vanes 149. As will be discussed below in more detail, the gas generator turbine 142 drives the gas generator compressor 110 via a gas generator shaft 160, and the power turbine 144 drives an output shaft 180 via a power turbine shaft 170.

As shown in the embodiment illustrated in FIG. 2, the gas generator compressor 110 and the gas generator turbine 142 are coupled to one another via the gas generator shaft 160. In operation, the combustion gases 136 drive both the gas generator turbine 142 and the power turbine 144. As the gas generator turbine 142 rotates around the centerline axis 102, the gas generator compressor 110 and the gas generator shaft 160 both rotate around the centerline axis 102. Further, as the power turbine 144 rotates, the power turbine shaft 170 rotates and transfers rotational energy to the output shaft 180. As an example, the gas turbine engine 100 may be the first and second gas turbine engines 60, 62 of FIG. 1, and the output shaft 180 may rotate both the main rotor blades 44 and the tail rotor blades 54 of the aerial vehicle 10.

It should be appreciated that, although a particular gas turbine engine (e.g., turboshaft gas turbine engine) has been illustrated and described in FIG. 2, any suitable type of gas turbine engine will benefit from the present disclosure. For instance, in some implementations, the gas turbine engine can be a turbofan gas turbine engine. Alternatively, the gas turbine engine can be a turboprop gas turbine engine.

Figure 3:
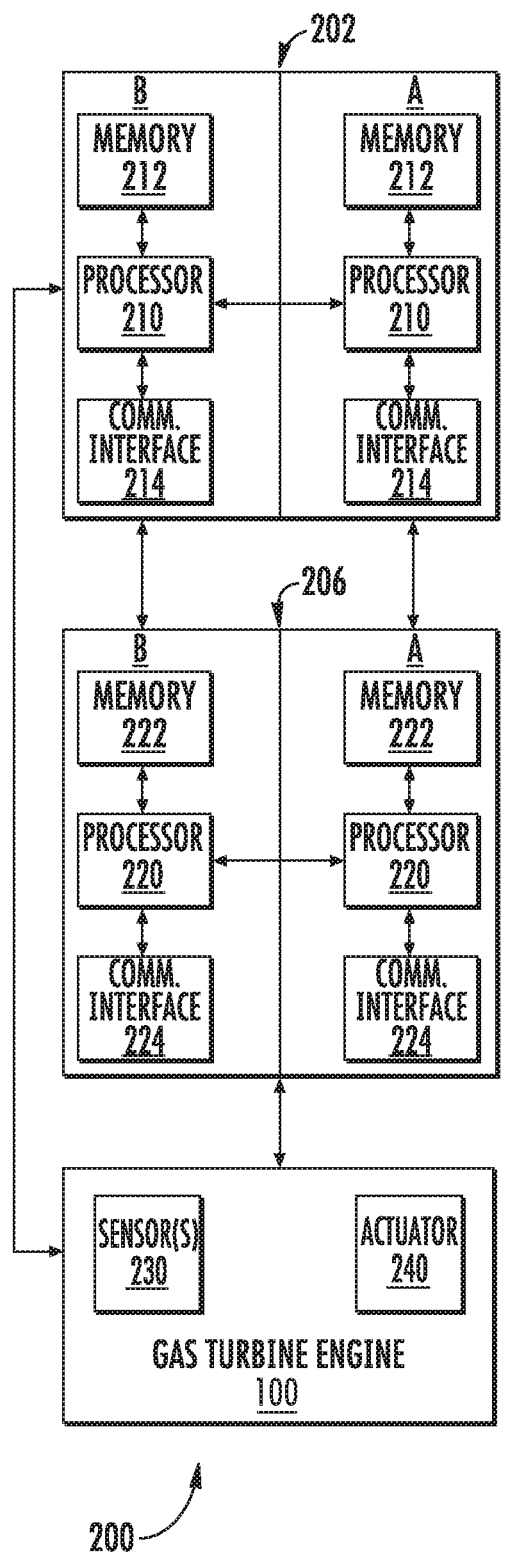
FIG. 3 illustrates a schematic view of an engine control system according to example embodiments of the present disclosure.

Referring now to FIG. 3, an example embodiment of the engine control system 200 for controlling the operation of the gas turbine engine 100 (FIG. 2) is provided. In general, the engine control system 200 will be described with reference to the aerial vehicle 10 and the gas turbine engine 100 described above with reference to FIGS. 1 and 2, respectively. However, in other embodiments, the engine control system 200 can be implemented or used in association with any other suitable aerial vehicle and/or any other suitable gas turbine engine.

As shown in FIG. 3, the engine control system 200 can include an engine controller 202 configured to control operation of the gas turbine engine 100. In some implementations, the engine controller 202 can control operation of the gas turbine engine 100 via a fuel controller 206. It should be appreciated, however, that in some implementations, the engine controller 202 can control operation of the gas turbine engine 100 without any intervening components (e.g., fuel controller 206).

As shown, the engine controller 202 can generally include one or more processor(s) 210 and associated memory 212 configured to perform a variety of computer-implemented functions (e.g., performing the methods, steps, calculations and the like disclosed herein). Additionally, the fuel controller 206 can include one or more processor(s) 220 and associated memory 222 configured to perform a variety of computer-implemented functions. It should be appreciated, however, that the fuel controller 206 can, in some implementations, be programmable logic devices, such as a Field Programmable Gate Array (FPGA).

As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 212, 222 may generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof.

In some implementations, the engine controller 202 can include a communications interface module 214. The communications interface module 214 can include associated electronic circuitry that is used to send and receive data. More specifically, the communications interface module 214 of the engine controller 202 can be used to send and receive data to and from the fuel controller 206. It should be appreciated that the communications interface module 214 may be any combination of suitable wired or wireless communications interfaces.

The engine controller 202 can be in communication with one or more sensor(s) 230 of the gas turbine engine 100. Examples of the one or more sensor(s) 230 can include, without limitation, a pressure sensor, a temperature sensor, a torque sensor, and a speed sensor. As an example, the pressure sensor may be configured to sense an ambient pressure (P0) or an inlet pressure (P1) at the gas generator compressor 110 (FIG. 2), and the temperature sensor may be configured to sense an inlet temperature (T1) at the gas generator compressor 110. Alternatively or additionally, the pressure sensor can be configured to sense a discharge pressure ($P_{S3}$) at the outlet of the gas generator compressor 110, and the temperature sensor may be configured to sense a turbine gas temperature ($T_{4.5}$) within the turbine 140. The torque sensor may be configured to detect an engine torque (Q1) of the gas turbine engine 100. The speed sensor may be configured to detect a rotational speed $N_G$ of the gas generator shaft 160. Alternatively or additionally, the speed sensor can be configured to detect a rotational speed NP of the power turbine shaft 170. Accordingly, the one or more sensor(s) 230 of the gas turbine engine 100 can include any combination of the sensors (e.g., pressure, temperature, torque, speed) mentioned above.

It should be appreciated that, in some implementations, the engine controller 202 can be communicatively coupled to the one or more sensor(s) 230 of the gas turbine engine 100 via a wired connection. For example, the engine controller 202 can receive data (e.g., analog or digital) from the one or more sensor(s) 230 of the gas turbine engine 100 via the wired connection. The fuel controller 206 can include a communications interface module 224. The communications interface module 224 can include associated electronic circuitry that is used to send and receive data to and from the engine controller 202. It should be appreciated that the communications interface module 224 may be any suitable wired or wireless communications interface.

In some implementations, the fuel controller 206 can be in communication with one or more actuators 240 of the gas turbine engine 100. Examples of the one or more actuators 240 can include at least one of a torque motor and a fuel metering solenoid valve. It should be appreciated, however, that the fuel controller 206 can be in communication with any suitable type of actuators of the gas turbine engine 100.

As shown in FIG. 3, the engine controller 202 can be a dual-channel system with two redundant channels, a first channel A and a second redundant channel B. It should be appreciated, however, that the engine controller 202 can include more than two channels. For instance, in some implementations, the engine controller 202 can include three or more channels. In this manner, the engine controller 202 can be at least a triple redundant system.

For both the engine controller 202 and the fuel controller 206, channels A and B may provide redundancy in the engine control and operation. In particular, the first channel A and the second redundant channel B of the engine controller 202 can include the processor 210, the memory 212, and the communications interface module 214. Similarly, the first channel A and the second redundant channel B of the fuel controller 206 can include the processor 220, the memory 222, and the communication interface module 224. As will be discussed below in more detail, the engine controller 202 can be configured to handle a simultaneous failure of all channels (e.g., first channel A, second channel B) of the engine controller 202 according to example embodiments of the present disclosure.

Figure 4:
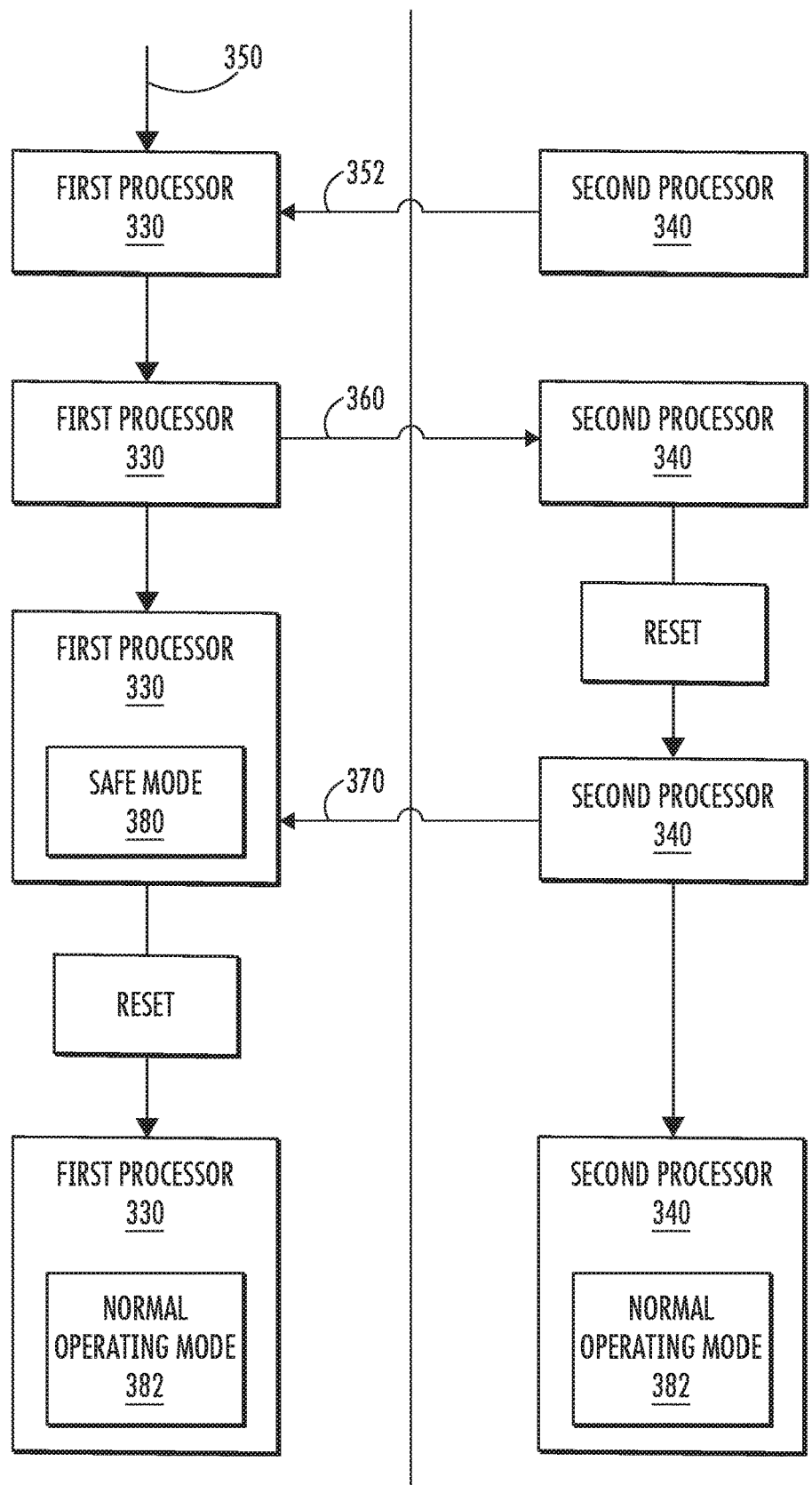
FIG. 4 depicts a control flow diagram of a multi-channel engine controller handling a simultaneous failure of all channels of the multi-channel engine controller according to example embodiments of the present disclosure.

Referring now to FIG. 4, a control flow diagram of an example multi-channel engine controller handling a simultaneous failure of all channels thereof is provided according to example embodiments of the present disclosure. As shown, the multi-channel engine controller can include at least a first channel 310 and a second channel 320. It should be appreciated, however, that the multi-channel engine controller can have more than two channels. For instance, in some implementations, the multi-channel engine controller can include three or more channels.

As shown, the multi-channel engine controller can include a processor associated with each channel of thereof. For instance, the multi-channel engine controller can include a first processor 330 associated with the first channel 310 and a second processor 340 associated with the second channel 320. In some implementations, the multi-channel engine controller can, when controlling operation of a gas turbine engine of an aerial vehicle, experience a simultaneous failure of all channels (e.g., first channel 310 and second channel 320) of the multi-channel engine controller. More specifically, the first processor 330 associated with the first channel 310 and the second processor 340 associated with the second channel 320 can each simultaneously experience one or more fault conditions (e.g., software exceptions). As will be discussed below in more detail, the multi-channel engine controller can be configured to recover from the simultaneous failure of all channels of the multi-channel engine controller without compromising control of the aerial vehicle.

In some implementations, the first processor 330 can be configured to obtain data indicative of the simultaneous failure of all channels (e.g., at least the first channel 310 and the second channel 320) of the multi-channel engine controller. For example, the first processor 330 can simultaneously obtain data indicative of one or more fault conditions associated with each channel of the multi-channel engine controller. For instance, the first processor 330 can obtain data indicative of one or more fault conditions associated with the first channel 310 and one or more fault conditions associated with the second channel 320.

In some implementations, the first processor 330 can be configured to determine whether the first channel is healthier than every other channel (e.g., at least the second channel 320) of the multi-channel engine controller based, at least in part, on the data indicative of the one or more fault conditions associated with each channel (e.g., at least the first channel 310 and the second channel 320). For instance, the first processor 330 can be configured to compare the one or more fault conditions associated with the first processor 330 to the one or more fault conditions associated with the second processor 340. In some implementations, the first processor 330 can be configured to determine the first processor 330 is healthier than the second processor 340 when a total number of the fault conditions associated with the first processor 330 is less than a total number of the fault conditions associated with the second processor 340. Conversely, the first processor 330 can be configured to determine the second processor 340 is healthier than the first processor 330 when the total number of the fault conditions associated with the first processor 330 is greater than the total number of fault conditions associated with the second processor 340.

As shown, the first processor 330 can be configured to provide one or more control signals 360 to the second processor 340 in response to determining the first channel 310 is healthier than every other channel (e.g., at least the second channel 320) of the multi-channel engine controller. More specifically, the one or more control signals can be associated with resetting at least the second processor 340. In this manner, the second processor 340 can be configured to reset (e.g., reinitialize, reboot, etc.) itself in response to receiving the one or more control signals from the first processor 330.

The first processor 330 can be further configured to configure itself in a safe mode 380 in response to determining the first channel 310 is healthier than every other channel (e.g., at least the second channel 320) of the multi-channel engine controller. When the first processor 330 is configured in the safe mode 380, control capabilities of the first processor 330 can be limited. For instance, the first processor 330 can be configured to perform only critical functions necessary to provide uniform control of the gas turbine engine while the multi-channel engine controller is recovering from the simultaneous failure of all channels thereof. One example of a critical function can include, without limitation, monitoring one or more watchdog timers associated with the first processor 330.

In some implementations, the first processor 330 can be configured to control operation of the one or more actuators 240 (FIG. 3) of the gas turbine engine while the first processor 330 is configured in the safe mode 380. For instance, the first processor 330 can be configured to control operation of the one or more actuators 240 to provide control of critical functions while executing a limited set of computer-implementable instructions (e.g., software). Examples of the one or more actuators 240 can include at least one of a torque motor and a fuel metering solenoid valve. It should be appreciated, however, that the first processor 330 can be configured to control any suitable actuator associated with the gas turbine engine.

As discussed above, the second processor 340 can be configured to reset itself upon receiving the one or more control signals 360 provided via the first processor 330. In response to resetting the second processor 340, the second processor 340 can be configured to determine whether the one or more fault conditions associated with the second processor 340 still exist. When the second processor 340 determines the one or more fault conditions associated with the second processor 340 no longer exist, the second processor 340 can provide data to the first processor 330 to indicate the second channel 320 has recovered from the one or more fault conditions. For instance, in some implementations, the data can include one or more control signals 370 associated with resetting the first processor 330. It should be appreciated that the first processor 330 can, upon receiving the data, be configured to reset itself.

When the first processor 330 is resetting itself, the second processor 340 can be configured to control operation of the gas turbine engine. It should be appreciated that the second processor 340 can be configured to operate in a normal operating mode 382 (e.g., not the safe mode 380) since the second processor 340 was previously reset to clear the one or more fault conditions associated with the second channel 320. In this manner, the gas turbine engine can operate normally while the first processor 330 is being reset to clear the one or more fault conditions associated with the first channel 310. As shown, both the first processor 330 and the second processor 340 can be configured to operate in the normal operating mode 382 when the first processor 330 resets itself and successfully clears the or more fault conditions associated with the first channel 310. As will be discussed below in more detail, an initial reset of the second processor 340 may not, in some instances, result in the one or more fault conditions associated with the second channel 320 being cleared.

Figure 5:
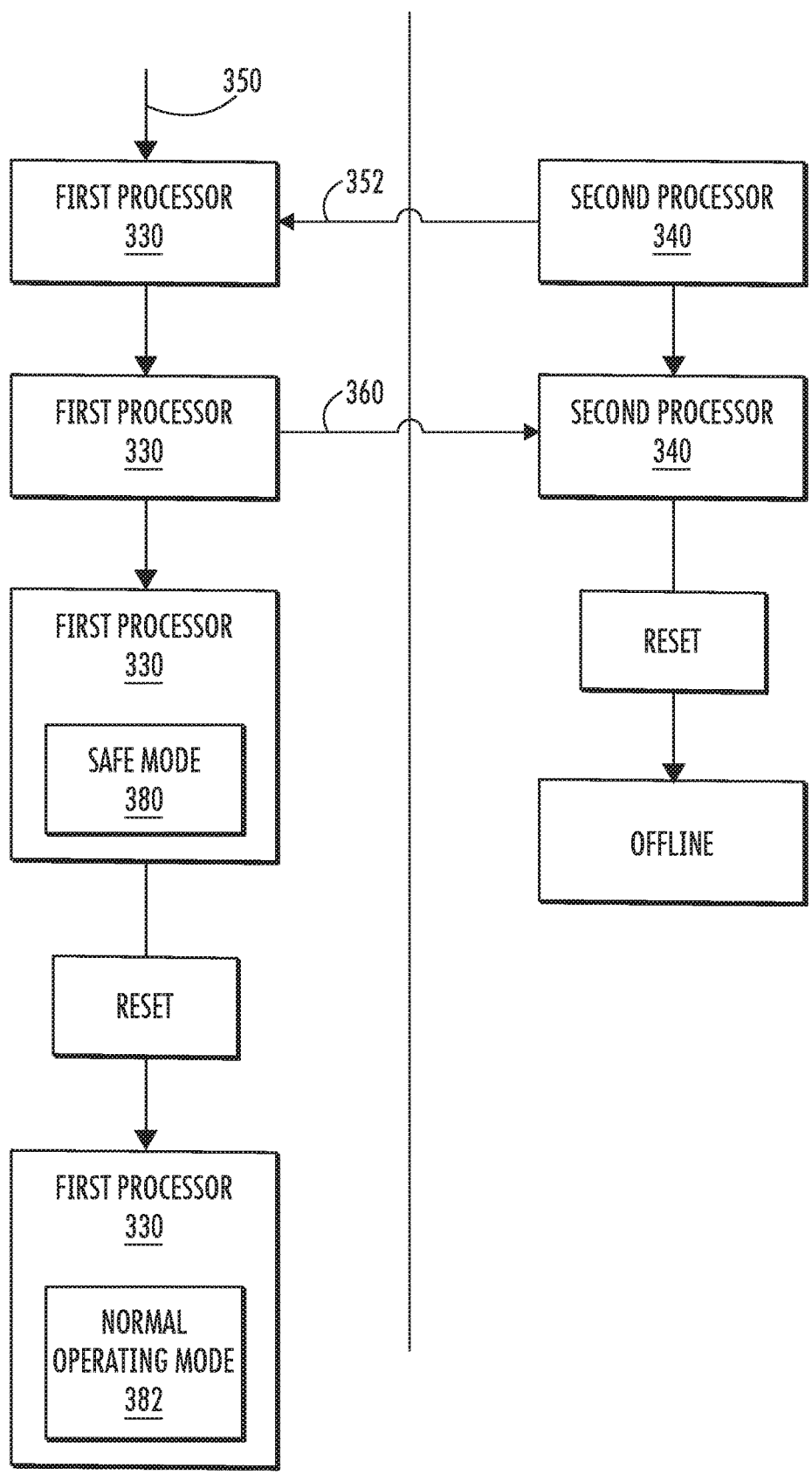
FIG. 5 depicts another control flow diagram of a multi-channel engine controller handling a simultaneous failure of all channels of the multi-channel engine controller according to example embodiments of the present disclosure.

Referring now to FIG. 5, when the second processor 340 determines the one or more fault conditions associated with the second channel 320 still exist after the initial reset, the second processor 340 can be configured to reboot itself again and subsequently check again to see if the one or more fault conditions associated with the second channel 320 still exist. It should be appreciated that the second processor 340 can be configured to reset itself a predetermined number of times. If the one or more fault conditions associated with the second processor 340 still exist after the second processor 340 has reset itself the predetermined number of times, the one or more fault conditions associated with the second processor 340 can be considered non-recoverable fault conditions. In this manner, the second channel 320 cannot be brought back online.

In implementations in which resetting the second processor 340 does not resolve (e.g. clear) the one or more fault conditions associated with the second channel 320, the first processor 330 can be configured to reset itself while configured in the safe mode 380 to clear the one or more fault conditions associated with the first channel 310. It should be appreciated that the first processor 330 can be configured to reset itself within a predetermined amount of time to minimize an amount of time the first processor 330 is offline and therefore unavailable to control operation of the gas turbine engine. For instance, in some implementations, the predetermined amount of time can range from about 2 milliseconds to about 5 milliseconds. In this manner, the engine controller can be configured to handle a simultaneous failure of all channels of the engine controller during critical portions of a flight, such as during vertical takeoff and landing where loss of control of the gas turbine engine cannot exceed 12 milliseconds.

Figure 6:
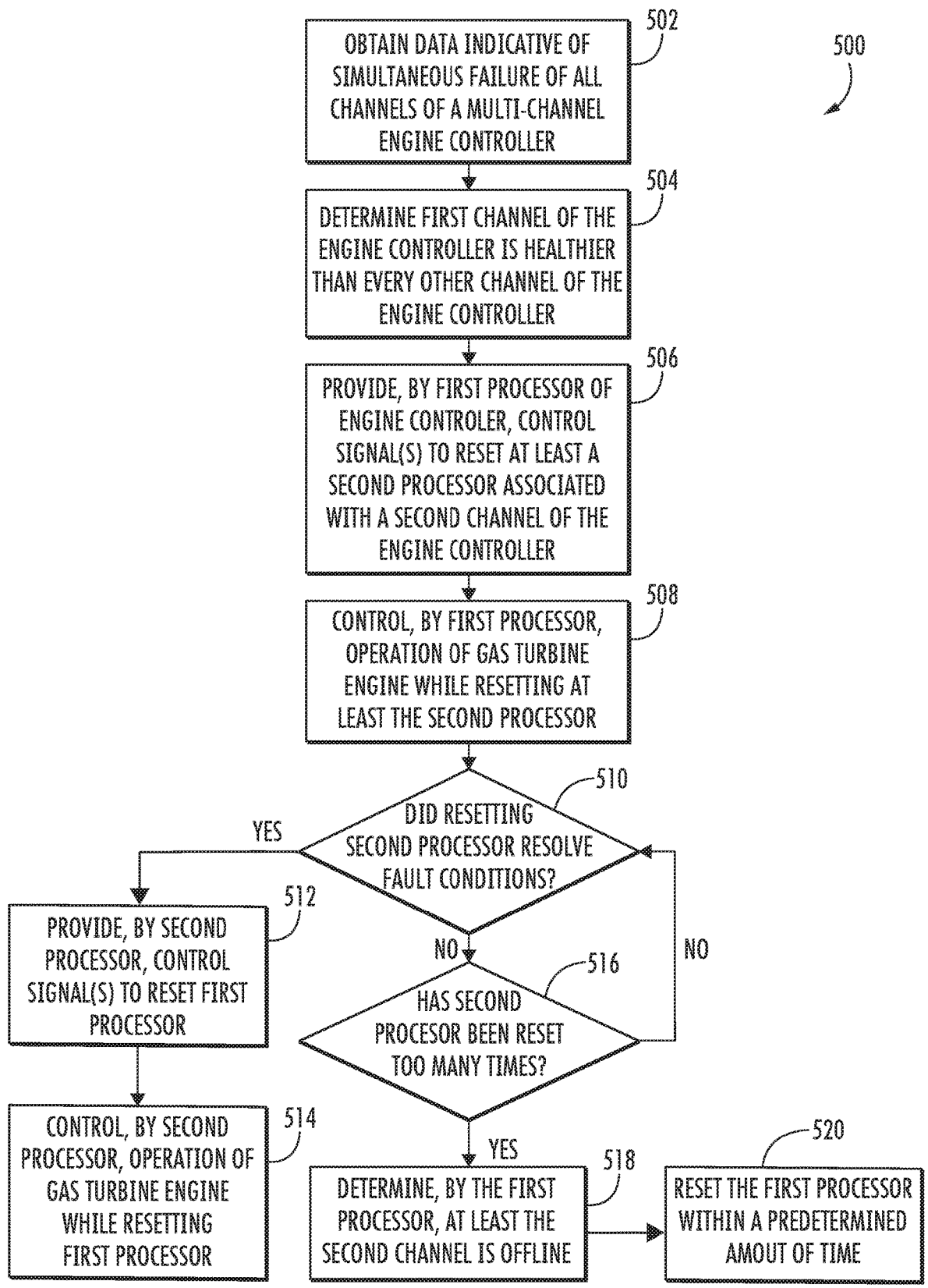
FIG. 6 illustrates a flow diagram of one embodiment of a method for handling a simultaneous failure of all channels of a multi-channel engine controller configured to control operation of a gas turbine engine according to example embodiments of the present disclosure.

Referring now to FIG. 6, a flow diagram of a method 500 for handling a simultaneous failure of all channels of a multi-channel engine controller configured to control operation of a gas turbine engine is provided according to example embodiments of the present disclosure. In general, the method 500 will be discussed herein with reference to the multi-channel engine controller described above with reference to FIGS. 4 and 5. However, it should be appreciated by those of ordinary skill in the art that the disclosed method 500 may generally be implemented with gas turbine engines having any other suitable engine configuration and/or with systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (502), the method 500 can include obtaining, by a first processor associated with a first channel of the engine controller, data indicative of the simultaneous failure of all channels of the multi-channel engine controller. For instance, the first processor can obtain data indicative of one or more fault conditions associated with each channel of the multi-channel engine controller.

At (504), the method 500 can include determining, by the first processor, the first channel is healthier than every other channel of the multi-channel engine controller. For instance, in some implementations, the first processor can be configured to compare the one or more fault conditions associated with the first channel to the one or more fault conditions associated with every other channel (e.g., at least the second channel) of the multi-channel engine controller. More specifically, the first processor can be configured to determine the first channel is healthier than every other channel of the multi-channel engine controller when a total number of fault conditions associated with the first channel is less than a total number of fault conditions associated with each of the remaining channels (e.g., at least the second channel) of the multi-channel engine controller.

At (506), the method 500 can include providing, by the first processor, one or more control signals associated with resetting at least a second processor associated with a second channel of the multi-channel engine controller based, at least in part, on the data obtained at (502). In some implementations, providing the one or more control signals associated with resetting at least the second processor associated with the second channel of the multi-channel engine controller in response to determining the first channel is healthier than every other channel (e.g., at least the second channel) of the multi-channel engine controller at (504).

At (508), the method 500 can include controlling, by the first processor, operation of the gas turbine engine while resetting at least the second processor to attempt to resolve (e.g., clear) the one or more fault conditions associated with at least the second channel of the multi-channel engine controller. It should be understood that the first processor can be configured in a safe mode to control operation of the gas turbine engine at (508). In some implementations, the first processor can be configured to operation of one or more actuators of the gas turbine engine such that operation of the gas turbine engine is uniform (e.g., constant) while resetting at least the second processor associated with the second channel of the multi-channel engine controller.

At (510), the method 500 can include determining, by the second processor, whether resetting at least the second processor resolved (e.g., cleared) the one or more fault conditions associated with the second channel. If the second processor determines resetting the second processor resolved the one or more fault conditions associated with the second channel, the method 500 proceeds to (512). Otherwise, the method 500 proceeds to (516).

At (512), the method 500 can include providing, by the second processor, one or more control signals associated with resetting the first processor to resolve (e.g., clear) the one or more fault conditions associated with the first channel.

At (514), the method 500 can include controlling, by the second processor, operation of the gas turbine engine while resetting the first processor. It should be understood that the second processor is not configured in the safe mode while controlling operation of the gas turbine engine since the one or more fault condition associated with the second channel were previously resolved by resetting the second processor at (506). In this manner, the multi-channel engine controller can maintain control of the aerial vehicle while recovering from the simultaneous failure of all channels thereof.

At (516), the method 500 can include determining, by the second processor, whether at least the second processor has been reset a predetermined number of times. If the number of times at least the second processor has been reset is equal to the predetermined number of times, the method proceeds to (518). Otherwise, at least the second processor resets and the method 500 reverts to (516).

At (518), the method 500 can include determining, by the first processor, at least the second channel is offline and proceeding to (520). At (520), the method 500 can include resetting the first processor within a predetermined amount of time. For instance, in some implementations, the predetermined amount of time can range from about 1 millisecond to about 5 milliseconds. In such implementations, engine controllers implementing the method 500 according to the present disclosure can be implemented on aerial vehicles capable of vertical takeoffs and landings, because the multi-channel engine controller can recover from a simultaneous failure of all channels thereof without losing control of operation of the gas turbine engine for more than 12 milliseconds.

Further aspects of the invention are provided by the subject matter of the following clauses:

1. A method for handling a simultaneous failure of all channels of a multi-channel engine controller configured to control operation of a gas turbine engine, the method comprising: obtaining, by a first processor associated with a first channel of the multi-channel engine controller, data indicative of the simultaneous failure of all channels of the multi-channel engine controller; providing, by the first processor, one or more control signals associated with resetting at least a second processor associated with a second channel of the multi-channel engine controller based, at least in part, on the data; and controlling, by the first processor, operation of the gas turbine engine while at least the second processor is resetting.

2. The method of any preceding aspect, further comprising determining, by the first processor associated with the first channel of the multi-channel engine controller, that the first channel is healthier than every other channel of the multi-channel engine controller based, at least in part, on the data.

3. The method of any preceding aspect, wherein determining that the first channel is healthier than every other channel of the multi-channel engine controller comprises comparing, by the first processor, one or more fault conditions associated with the first channel to one or more fault conditions associated with each of the remaining channels of the multi-channel engine controller.

4. The method of any preceding aspect, wherein providing the one or more control signals associated with resetting at least the second processor associated with the second channel of the multi-channel engine controller occurs in response to determining the first channel is healthier than every other channel of the multi-channel engine controller.

5. The method of any preceding aspect, wherein controlling operation of the gas turbine engine while the second processor is resetting comprises controlling, by the first processor, operation of one or more actuators of the gas turbine engine such that operation of the gas turbine engine is uniform while resetting the second processor.

6. The method of any preceding aspect, wherein the one or more actuators comprise at least one of a torque motor and a fuel metering solenoid valve.

7. The method of any preceding aspect, further comprising determining, by the second processor, one or more fault conditions associated with the second channel no longer exist subsequent to resetting the second processor; and providing, by the second processor, one or more control signals associated with resetting the first channel in response to determining the one or more fault conditions associated with the second channel no longer exist.

8. The method of any preceding aspect, further comprising controlling, by the second processor, operation of the gas turbine engine while the first processor is resetting.

9. The method of any preceding aspect, further comprising determining, by the first processor, at least the second channel is offline when a predetermined amount of time lapses without the first processor receiving data indicating at least the second processor has reset.

10. The method of any preceding aspect, further comprising responsive to determining at least the second channel is offline, providing, by the first processor, one or more control signals associated with resetting the first processor within a predetermined amount of time; and controlling, by the first processor, operation of the gas turbine engine subsequent to resetting the first processor.

11. The method of any preceding aspect, wherein the predetermined amount of time ranges from about 1 millisecond to about 5 milliseconds.

12. A multi-channel engine controller configured to control operation of a gas turbine engine, the multi-channel engine controller comprising a plurality of processors, each of the plurality of processors associated with a corresponding channel of the multi-channel engine controller, wherein a first processor associated with a first channel of the multi-channel engine controller is configured to: obtain data indicative of a simultaneous failure of all channels of the multi-channel engine controller; provide one or more control signals associated with resetting at least a second processor associated with a second channel of the multi-channel engine controller based, at least in part, on the data; and control operation of the gas turbine engine while at least the second processor is resetting.

13. The multi-channel engine controller of any preceding aspect, wherein the first processor is further configured to determine the first channel is healthier than every other channel of the multi-channel engine controller based, at least in part, on the data.

14. The multi-channel engine controller of any preceding aspect, wherein the first processor is configured to compare one or more fault conditions associated with the first channel to one or more fault conditions associated with each of the remaining channels of the multi-channel engine controller.

15. The multi-channel engine controller of any preceding aspect, wherein the first processor is configured to provide the one or more control signals to at least the second processor in response to the first processor determining the first channel is healthier than every other channel of the multi-channel engine controller.

16. The multi-channel engine controller of any preceding aspect, wherein the first processor is configured to control operation of one or more actuators to control operation of the gas turbine engine such that operation of the gas turbine engine is uniform while at least the second processor is resetting.

17. The multi-channel engine controller of any preceding aspect, wherein the one or more actuators comprise at least one of a torque motor and a fuel metering solenoid valve.

18. The multi-channel engine controller of any preceding aspect, wherein the second processor is configured to determine one or more fault conditions associated with the second channel no longer exist subsequent to resetting the second processor; provide one or more control signals associated with resetting the first processor in response to determining the one or more fault conditions associated with the second channel no longer exist; and control operation of the gas turbine engine while the first processor is resetting.

19. The multi-channel engine controller of any preceding aspect, wherein the first processor is further configured to determine the second channel is offline when a predetermined amount of time lapses without the first processor receiving data indicating the second processor has reset.

20. The multi-channel engine controller of any preceding aspect, wherein when the first processor determines the second channel is offline, the first processor is further configured to provide one or more control signals associated with resetting the first processor within a predetermined amount of time; and control operation of the gas turbine engine subsequent to resetting the first processor.

This written description uses examples to disclose the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for handling simultaneous software exceptions for a multi-channel engine controller configured to control operation of a gas turbine engine, the method comprising:
    obtaining, by a first processor associated with a first channel of the multi-channel engine controller, data indicative of a respective number of software exceptions for each channel, for all channels of the multi-channel engine controller;
    determining, by the first processor associated with the first channel of the multi-channel engine controller, that the first channel is healthier than every other channel of the multi-channel engine controller based on the first processor having fewer software exceptions than each of the other channels;
    providing, by the first processor, one or more control signals associated with resetting at least a second processor associated with a second channel of the multi-channel engine controller based, at least in part, on the data;

controlling, by the first processor, operation of the gas turbine engine while at least the second processor is resetting; and while at least the second processor is resetting, the first processor entering a safe mode in which the first processor performs only critical functions.

2. The method of claim 1, wherein determining that the first channel is healthier than every other channel of the multi-channel engine controller comprises comparing, by the first processor, one or more software exceptions associated with the first channel to one or more software exceptions associated with each of the remaining channels of the multi-channel engine controller.

3. The method of claim 1, wherein providing the one or more control signals associated with resetting at least the second processor associated with the second channel of the multi-channel engine controller occurs in response to determining the first channel is healthier than every other channel of the multi-channel engine controller.

4. The method of claim 1, wherein controlling operation of the gas turbine engine while the second processor is resetting comprises:

controlling, by the first processor, operation of one or more actuators of the gas turbine engine such that operation of the gas turbine engine is uniform while resetting the second processor.

5. The method of claim 4, wherein the one or more actuators comprise at least one of a torque motor and a fuel metering solenoid valve.

6. The method of claim 1, further comprising:

determining, by the second processor, one or more software exceptions associated with the second channel no longer exist subsequent to resetting the second processor; and providing, by the second processor, one or more control signals associated with resetting the first channel in response to determining the one or more software exceptions associated with the second channel no longer exist.

7. The method of claim 6, further comprising:

controlling, by the second processor, operation of the gas turbine engine while the first processor is resetting.

8. The method of claim 1, further comprising:

determining, by the first processor, at least the second channel is offline when a predetermined amount of time lapses without the first processor receiving data indicating at least the second processor has reset.

9. The method of claim 8, further comprising:

responsive to determining at least the second channel is offline, providing, by the first processor, one or more control signals associated with resetting the first processor within a predetermined amount of time; and controlling, by the first processor, operation of the gas turbine engine subsequent to resetting the first processor.

10. The method of claim 9, wherein the predetermined amount of time ranges from about 1 millisecond to about 5 milliseconds.

11. A multi-channel engine controller configured to control operation of a gas turbine engine, the multi-channel engine controller comprising:

a plurality of processors, each of the plurality of processors associated with a corresponding channel of the multi-channel engine controller, wherein a first processor of the plurality of processors associated with a first channel of the multi-channel engine controller is configured to:

obtain data indicative of a respective number of software exceptions for each channel, for all channels of the multi-channel engine controller;

determine that the first channel is healthier than every other channel of the multi-channel engine controller based on the first processor having fewer software exceptions than each of the other channels;

provide one or more control signals associated with resetting at least a second processor of the plurality of processors associated with a second channel of the multi-channel engine controller based, at least in part, on the data;

control operation of the gas turbine engine while at least the second processor is resetting; and while at least the second processor is resetting, enter a safe mode in which the first processor performs only critical functions.

12. The multi-channel engine controller of claim 11, wherein the first processor is configured to compare one or more software exceptions associated with the first channel to one or more software exceptions associated with each of the remaining channels of the multi-channel engine controller to determine the first channel is healthier than every other channel of the multi-channel engine controller.

13. The multi-channel engine controller of claim 11, wherein the first processor is configured to provide the one or more control signals to at least the second processor in response to the first processor determining the first channel is healthier than every other channel of the multi-channel engine controller.

14. The multi-channel engine controller of claim 11, wherein the first processor is configured to control operation of one or more actuators to control operation of the gas turbine engine such that operation of the gas turbine engine is uniform while at least the second processor is resetting.

15. The multi-channel engine controller of claim 14, wherein the one or more actuators comprise at least one of a torque motor and a fuel metering solenoid valve.

16. The multi-channel engine controller of claim 11, wherein the second processor is configured to:

determine one or more software exceptions associated with the second channel no longer exist subsequent to resetting the second processor;

provide one or more control signals associated with resetting the first processor in response to determining the one or more software exceptions associated with the second channel no longer exist; and control operation of the gas turbine engine while the first processor is resetting.

17. The multi-channel engine controller of claim 11, wherein the first processor is further configured to:

determine the second channel is offline when a predetermined amount of time lapses without the first processor receiving data indicating the second processor has reset.

18. The multi-channel engine controller of claim 17, wherein when the first processor determines the second channel is offline, the first processor is further configured to:

provide one or more control signals associated with resetting the first processor within a predetermined amount of time; and control operation of the gas turbine engine subsequent to resetting the first processor.

* * * * *